United States Patent
Sim et al.

(10) Patent No.: US 8,553,906 B2
(45) Date of Patent: Oct. 8, 2013

(54) APPARATUS FOR ENABLING KARAOKE

(75) Inventors: Wong Hoo Sim, Singapore (SG); Yew Teng Too, Singapore (SG); Tieh Cheng Goh, Singapore (SG)

(73) Assignee: Creative Technology Ltd, Singapore (SG)

( * ) Notice: Subject to any disclaimer, the term of this patent is extended or adjusted under 35 U.S.C. 154(b) by 701 days.

(21) Appl. No.: 12/698,453

(22) Filed: Feb. 2, 2010

(65) Prior Publication Data
US 2011/0188673 A1   Aug. 4, 2011

(51) Int. Cl.
*H03G 9/00* (2006.01)
*H04R 3/00* (2006.01)

(52) U.S. Cl.
USPC ........ 381/102; 381/122; 381/26; 381/91; 381/92; 381/95; 381/63; 381/103; 381/22

(58) Field of Classification Search
USPC ........ 381/102, 26, 91, 92, 95, 63, 103, 381/122; 434/307, 308, 309, 310; 84/600, 84/610, 626
See application file for complete search history.

(56) References Cited

U.S. PATENT DOCUMENTS

| | | | |
|---|---|---|---|
| 5,598,162 A * | 1/1997 | Terashima et al. | 341/176 |
| 6,278,048 B1 * | 8/2001 | Lee | 84/610 |
| 7,525,033 B2 * | 4/2009 | Lance | 84/477 R |
| 8,160,489 B2 * | 4/2012 | Strauser | 434/307 A |
| 2003/0117531 A1 * | 6/2003 | Rovner et al. | 348/729 |
| 2005/0084835 A1 * | 4/2005 | Lau et al. | 434/307 A |
| 2007/0253574 A1 * | 11/2007 | Soulodre | 381/94.2 |
| 2009/0022330 A1 * | 1/2009 | Haulick et al. | 381/57 |
| 2009/0023123 A1 * | 1/2009 | Seo | 434/307 A |
| 2009/0038468 A1 * | 2/2009 | Brennan | 84/609 |
| 2009/0165634 A1 * | 7/2009 | Mahowald | 84/610 |
| 2010/0247081 A1 * | 9/2010 | Victoria Pons | 386/117 |

FOREIGN PATENT DOCUMENTS

| | | | |
|---|---|---|---|
| JP | 2002006871 A | * | 1/2002 |
| JP | 2006091901 A | * | 4/2006 |

* cited by examiner

*Primary Examiner* — Mohammad Islam
*Assistant Examiner* — Kuassi Ganmavo
(74) *Attorney, Agent, or Firm* — Creative Technology Ltd

(57) ABSTRACT

There is provided an apparatus for enabling karaoke. The apparatus includes a casing for the apparatus; a microphone array incorporated within the casing, the microphone array being concealed from a user by the casing; a controller coupled to the microphone array to at least process audio signals from the user input at the microphone array; a data storage device coupled to the controller, the data storage device being for storing pre-recorded songs used for karaoke, and for storing songs as sung by the user; and an image capturing device coupled to the controller, the image capturing device being for capturing images of the user while the user is singing, with the captured images of the user being stored on the data storage device.

15 Claims, 1 Drawing Sheet

APPARATUS FOR ENABLING KARAOKE

FIELD OF INVENTION

This invention relates to an apparatus that facilitates the activity of karaoke for a user, particularly in relation to ease of access to the activity of karaoke for the user.

BACKGROUND

Nowadays, it is typical for many people to associate the activity of karaoke to be an activity which involves the setting up of voice manipulation/processing type of equipment together with other audio visual equipment. As such, there exists a general perception that the activity of karaoke involves a rather complicated set-up process involving the functional connection of several pieces of hardware, and this consequently has dissuaded people from taking up the activity altogether.

It should be noted that there have been devices which attempt to address the aforementioned complexity concerns pertaining to the activity of karaoke, but such devices have not been popular due to issues relating to, for example, undesirable user experience, limited device functionality in relation to the activity of karaoke, lack of portability, and the like. In view of the aforementioned, it is evident that there is a dearth of equipment available to users which facilitates the activity of karaoke both in a convenient manner for users and in a manner which provides a positive experience for the users.

The present invention aims to address the absence of such a device and correspondingly meet the unresolved needs of the users.

SUMMARY

There is provided an apparatus for enabling karaoke. The apparatus includes a casing for the apparatus; a microphone array incorporated within the casing, the microphone array being concealed from a user by the casing; a controller coupled to the microphone array to at least process audio signals from the user input at the microphone array; a data storage device coupled to the controller, the data storage device being for storing pre-recorded songs used for karaoke, and for storing songs as sung by the user; and an image capturing device coupled to the controller, the image capturing device being for capturing images of the user while the user is singing, with the captured images of the user being stored on the data storage device.

It is advantageous that the microphone array detects the audio signals from the user when the user is within a predefined field of detection of the microphone array. Preferably, the microphone array includes either omni-directional microphones or uni-directional microphones. The microphone array may be configured such that the predefined field of detection is spread over a wide area.

The apparatus may further include a receiver coupled to the controller to receive audio signals from the user using a wireless microphone.

It is preferable that the controller also performs a method for processing the pre-recorded songs. The method may include assessing audible lyrics of the pre-recorded songs; converting the audible lyrics to text for display on a screen connected to the apparatus; and muting audible lyrics from the pre-recorded songs. The method may also further include controlling audio output of the pre-recorded songs; and providing the audio output of the pre-recorded songs. The controller may control the audio output by adjusting parameters of audio output such as, for example, voice echo, music volume, voice volume, music pitch and so forth. The parameters of audio output may be adjusted using either a remote control device or voice control. The controller may also perform echo cancellation for secondary audio input at the microphone array, the secondary audio input being playback of the user's voice during the activity of karaoke.

The image capturing device may capture images of the user when the user is within a predefined field of capture of the image capturing device. The image capturing device may be either integrated within the casing or separate from the apparatus. The captured images of the user may be used for creating a video.

Preferably, the casing protects components of the apparatus.

The apparatus may further including a network port coupled to the controller, the network port enabling the connection of the apparatus to a network.

It is preferable that the captured images of the user singing and a recording of the singing by the user are merged into a music video. The music video may be transmitted over the network and distributed to either at least one recipient or a central video depository for storage. Advantageously, access to the stored videos on the central video depository by third parties may enable playback, and grading of the stored videos by the third parties.

DESCRIPTION OF FIGURES

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
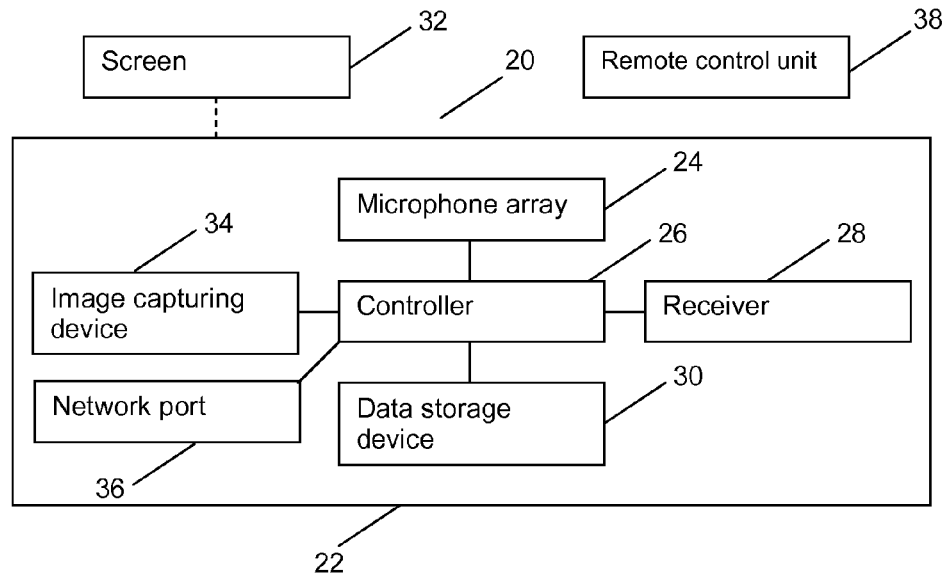
FIG. 1 shows a schematic view of the apparatus of the present invention.

With reference to FIG. 1, there is provided an apparatus 20 for enabling karaoke. It should be appreciated that the apparatus 20 is directed at enabling convenience for a user in relation to the activity of karaoke but not at the expense of the user experience. The apparatus 20 may be a standalone unit which may be portable without a need for much assembly/disassembly of parts of the apparatus 20 to the user as this also aids in the convenience to the user.

The apparatus 20 includes a casing 22 for the apparatus 20. The casing 22 may protect components of the apparatus 20 such that the apparatus 20 may be considered to be durable and robust. The casing 22 may be made from a either a metal or a plastic material as both materials provide strength without incurring an excessive penalty in relation to weight. The casing 22 may also incorporate a handle to aid in the portability of the apparatus 20.

There is a microphone array 24 incorporated within the casing 22 of the apparatus 20. The microphone array 24 may be concealed from the user by the casing 22, where the concealment of the microphone array 24 may be to protect the microphone array 24 from damage and may also be for maintaining aesthetic appearances of the apparatus 20. The microphone array 24 may detect the sound signals from the user when the user is within a predefined field of detection of the microphone array 24. It should be appreciated that the predefined field of detection of the microphone array 24 may be dependent on the technical specifications of microphones employed in the microphone array 24.

The microphone array 24 includes either omni-directional microphones or uni-directional microphones. The microphone array 24 may be able to capture audio input from either a spherical region or a hemispherical region around the apparatus 20 regardless of the type of microphones used in the microphone array 24. It is evident that using omni-directional microphones would provide a spherical region for capturing audio input, but it should be noted that varying a facing of uni-directional microphones may also provide a spherical region for capturing audio input. The microphone array 24 may be configured such that the predefined field of detection is spread over a wide area. When the predefined field of detection is spread over a wide area, a "sweet spot" of audio detection for the microphone array 24 is also correspondingly enlarged. This allows the user to be moving around while singing during the activity of karaoke and also enables audio signals to be able to be picked up from more positions around the apparatus 20. In an enclosed environment like a cabin of a vehicle, passengers in the cabin of the vehicle may participate in the activity of karaoke regardless of their seating position in the cabin and regardless of the location of the apparatus 20 in the cabin of the vehicle. It should be appreciated that the apparatus 20 may be employed in any enclosed environment, with an effective range of the apparatus 20 being dependent on the predefined field of detection for the microphone array 24.

The apparatus 20 should also include a controller 26 coupled to the microphone array 24 to at least process audio signals from the user input at the microphone array 24. The controller 26 may process the audio signals from the user input at the microphone array 24. The processing carried out by the controller 26 may include echo cancellation for secondary audio input at the microphone array, the secondary audio input being playback of the user's voice during the activity of karaoke. This ensures that a resultant post-processed output of the user is not processed again by the controller 26 as this would distort the intended audio output by the apparatus 20.

Figure 2:
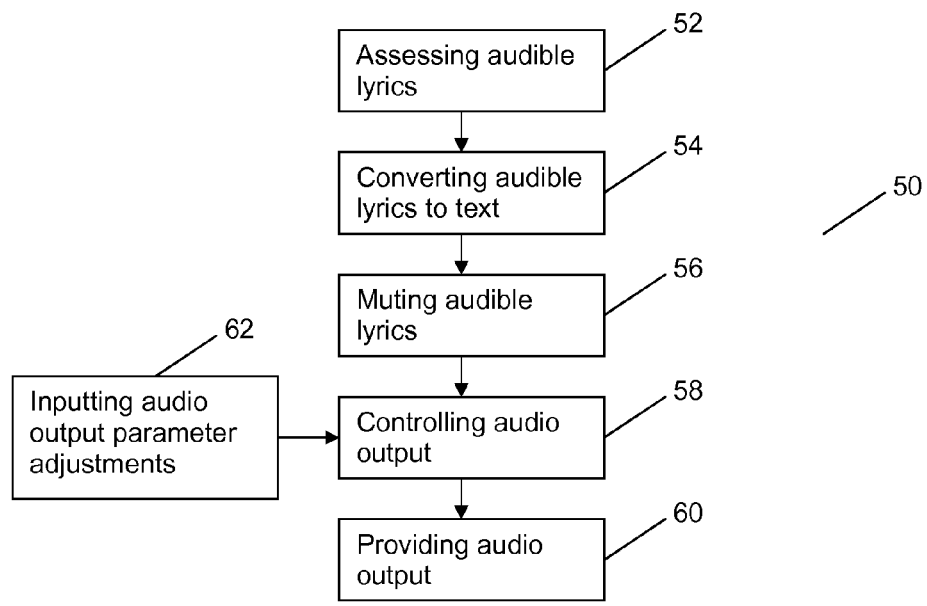
FIG. 2 shows a process flow of a controller of the apparatus of FIG. 1 when the controller is processing audio.

Furthermore, the controller 26 also performs a method 50 for processing pre-recorded songs used for karaoke as shown in FIG. 2. The method 50 advantageously allows any audio file to be used for the activity of karaoke. This is because the method 50 is able to generate "sing-along" text for the user even if there is no such text at an initial juncture. In this regard, the user is able to sing along to any audio file, which provides the user with a greater variety compared to being restricted to typical karaoke video sources.

The method 50 includes assessing audible lyrics of the pre-recorded songs (52) and converting the audible lyrics to text (54) for display on a screen 32 connected to the apparatus 20. The screen 32 may be either a device which is separate from the apparatus 20 or incorporated in the apparatus 20. The screen 32 may be, for example, an LCD panel, a TFT panel, a plasma panel, and so forth.

It should be appreciated that the assessment and conversion of the audible lyrics may be carried out using known speech-to-text conversion techniques and an actual speech-to-text conversion technique may be decided upon based on a processing capability of the controller 26. The method 50 also includes muting the audible lyrics (56) from the pre-recorded songs such that only the musical track of the pre-recorded songs is played back for the user for the user to sing-along to.

In addition, the method 50 also further includes controlling audio output (58) of the pre-recorded songs; and providing the audio output of the pre-recorded songs (60) to the user. The audio output may be controlled by adjusting parameters of audio output such as, for example, voice echo, music volume, voice volume, music pitch and so forth. The parameters of audio output may be adjusted using either a remote control device 38 or voice control. Voice control may be in the form of firstly, identification of control keywords such as, for example, echo, music volume, voice volume, pitch, and the like followed by identification of action keywords such as, for example, up, down, more, less, higher, lower and so forth. In order to avoid inadvertent adjustment of audio output parameters during use of voice control, it should be appreciated that voice control may be carried out only when the user is not singing as both the action keywords and control keywords may be found in the lyrics of a song being sung by the user.

The apparatus 20 may also include a data storage device 30 coupled to the controller 26, where the data storage device 30 may be for storing the pre-recorded songs used for karaoke, and for storing songs as sung by the user. The data storage device 30 may be non-volatile memory, and may be either in a form of a hard disk drive or in a form of a flash memory module. The storage of songs sung by the user may be to aid the user in assessing/reviewing the user's singing at a later juncture. It is also convenient for the user that the user's singing may be stored without using additional equipment, and that recording of the user's singing may be stored concurrently while the user is singing.

There may also be an image capturing device 34 coupled to the controller 26, whereby the image capturing device 34 may be for capturing images of the user when the user is singing, with the captured images of the user being stored on the data storage device 30. The image capturing device 34 may be either able to capture wide angle images which allow zooming into the user's image after requisite wide angle image correction processes are applied, or able to track the user's movements such that the user's expressions are fully captured during a duration when the user is singing. It should be noted that the image capturing device 34 may capture images of the user when the user is within a predefined field of capture (ie. field of view) of the image capturing device 34. It should also be noted that the image capturing device 34 may be either incorporated within the casing 22 or it may be a separate device that is able to be coupled to the controller 26 of the apparatus 20. The captured images of the user may subsequently be used for creating a video during an instance(s) while the user is singing. The video may merge images of the user while singing together with a recording of the singing by the user in a form of a music video.

The apparatus 20 may further include a receiver 28 coupled to the controller 26 to receive audio signals from the user using a wireless microphone. It should be appreciated that when the receiver 28 receives signals, the controller 26 would subsequently disable the microphone array 24, such that audio input is only input through the wireless microphone. It should be noted that a mobile phone may function as the wireless microphone.

Finally, the apparatus 20 may include a network port 36 coupled to the controller, where the network port 36 allows the apparatus 20 to be connectable to a network. The network port 36 may enable the apparatus 20 to be connectable to a network via either a cable connection or a wireless connection. When the apparatus 20 is connected to a network, the aforementioned video created using the captured images of the user may be transmitted over the network and distributed to either at least one recipient or a central video depository for storage. Access to the stored videos on the central video depository by third parties may enable at least playback, and grading of the stored videos by the third parties.

In view of the aforementioned, it should be appreciated that the apparatus 20 is able to meet the needs of users who wish to have an apparatus which allows convenient access to the activity of karaoke. However, it is evident that there are many aspects to the present invention which would further enhance the user experience during the activity of karaoke which would also appeal to the users of the apparatus 20.

Whilst there has been described in the foregoing description preferred embodiments of the present invention, it will be understood by those skilled in the technology concerned that many variations or modifications in details of design or construction may be made without departing from the present invention.

What is claimed is:

1. An apparatus for enabling karaoke, the apparatus including:
   a casing for the apparatus;
   a microphone array incorporated within the casing, the microphone array being concealed from a user by the casing;
   a controller coupled to the microphone array to at least process audio signals from the user input at the microphone array;
   a receiver coupled to the controller, the receiver being configurable to receive audio signals from the user using a wireless microphone and when the audio signals are received from the wireless microphone, the controller is configurable to disable the microphone array such that audio input is only input through the wireless microphone;
   a data storage device coupled to the controller, the data storage device being for storing pre-recorded songs used for karaoke, and for storing songs as sung by the user; and
   an image capturing device coupled to the controller, the image capturing device being for capturing images of the user while the user is singing, with the captured images of the user being stored on the data storage device,
   wherein the microphone array detects the audio signals from the user when the user is within a predefined field of detection of the microphone array, and
   wherein the controller also performs a method for processing the pre-recorded songs, the method including:
   (a) assessing audible lyrics of the pre-recorded songs;
   (b) converting the audible lyrics to text for display on a screen connected to the apparatus; and
   (c) muting audible lyrics from the pre-recorded songs.

2. The apparatus of claim 1, wherein the microphone array includes either omni-directional microphones or uni-directional microphones.

3. The apparatus of claim 1, wherein the controller performs the method which further includes
   controlling audio output of the pre-recorded songs; and
   providing the audio output of the pre-recorded songs.

4. The apparatus of claim 3, wherein the controller controls the audio output by adjusting parameters of audio output selected from a group consisting of: voice echo, music volume, voice volume, and music pitch.

5. The apparatus of claim 4, wherein the parameters of audio output are adjusted using either a remote control device or voice control.

6. The apparatus of claim 1, wherein the image capturing device captures images of the user when the user is within a predefined field of capture of the image capturing device.

7. The apparatus of claim 1, wherein the captured images of the user is used for creating a video.

8. The apparatus of claim 1, wherein the casing protects components of the apparatus.

9. The apparatus of claim 1, wherein the controller performs echo cancellation for secondary audio input at the microphone array, the secondary audio input being playback of the user's voice during the activity of karaoke.

10. The apparatus of claim 1, wherein the microphone array is configured such that the predefined field of detection is spread over a wide area.

11. The apparatus of claim 1, wherein the image capturing device is either integrated within the casing or separate from the apparatus.

12. The apparatus of claim 1, further including a network port coupled to the controller, the network port enabling the connection of the apparatus to a network.

13. The apparatus of claim 12, wherein the captured images of the user singing and a recording of the singing by the user are merged into a music video.

14. The apparatus of claim 13, wherein the music video is transmitted over the network and distributed to either at least one recipient or a central video depository for storage.

15. The apparatus of claim 14, wherein access to the stored videos on the central video depository by third parties may enable playback, and grading of the stored videos by the third parties.

* * * * *